(12) United States Patent
Liu et al.

(10) Patent No.: US 11,024,027 B2
(45) Date of Patent: Jun. 1, 2021

(54) MANIPULABLE OBJECT SYNTHESIS IN 3D MEDICAL IMAGES WITH STRUCTURED IMAGE DECOMPOSITION

(71) Applicant: Siemens Healthcare GmbH, Erlangen (DE)

(72) Inventors: Siqi Liu, Princeton, NJ (US); Eli Gibson, Plainsboro, NJ (US); Sasa Grbic, Plainsboro, NJ (US); Zhoubing Xu, Plainsboro, NJ (US); Arnaud Arindra Adiyoso, Nuremberg (DE); Bogdan Georgescu, Plainsboro, NJ (US); Dorin Comaniciu, Princeton Junction, NJ (US)

(73) Assignee: Siemens Healthcare GmbH, Erlangen (DE)

(*) Notice: Subject to any disclaimer, the term of this patent is extended or adjusted under 35 U.S.C. 154(b) by 102 days.

(21) Appl. No.: 16/570,214

(22) Filed: Sep. 13, 2019

(65) Prior Publication Data
US 2021/0082107 A1    Mar. 18, 2021

(51) Int. Cl.
*G06T 7/149* (2017.01)
*G06K 9/62* (2006.01)
(Continued)

(52) U.S. Cl.
CPC .......... *G06T 7/0012* (2013.01); *G06K 9/6256* (2013.01); *G06K 9/6261* (2013.01); *G06K 9/6262* (2013.01); *G06K 9/6267* (2013.01); *G06N 3/04* (2013.01); *G06N 3/08* (2013.01); *G06T 7/149* (2017.01); *G06K 2209/053* (2013.01); *G06T 2207/20081* (2013.01);
(Continued)

(58) Field of Classification Search
CPC .......... G06T 7/0012; G06T 7/149; G06T 2207/20081; G06T 2207/20084; G06T 2207/30064; G06K 9/6256; G06K 9/6261; G06K 9/6262; G06K 9/6267; G06K 2209/053; G06N 3/04; G06N 3/08
See application file for complete search history.

(56) References Cited

U.S. PATENT DOCUMENTS

| | | | |
|---|---|---|---|
| 8,157,742 B2 * | 4/2012 | Taylor | G16H 50/50 600/504 |
| 2013/0197881 A1 * | 8/2013 | Mansi | A61N 1/3627 703/2 |

FOREIGN PATENT DOCUMENTS

| | | | | |
|---|---|---|---|---|
| WO | WO-2005096224 A1 * | 10/2005 | | G06K 9/34 |

OTHER PUBLICATIONS

Jin et al., "CT-Realistic Lung Nodule Simulation from 3D Conditional Generative Adversarial Networks for Robust Lung Segmentation", MICCAI, Jun. 11, 2018, arXiv:1806.04051v1, 8 pgs.
(Continued)

*Primary Examiner* — Utpal D Shah

(57) ABSTRACT

Systems and methods for generating synthesized images are provided. An input medical image patch, a segmentation mask, a vector of appearance related parameters, and manipulable properties are received. A synthesized medical image patch including a synthesized nodule is generated based on the input medical image patch, the segmentation mask, the vector of appearance related parameters, and the manipulable properties using a trained object synthesis network. The synthesized nodule is synthesized according to the manipulable properties. The synthesized medical image patch is output.

20 Claims, 11 Drawing Sheets

(51) Int. Cl.
  *G06N 3/04* (2006.01)
  *G06T 7/00* (2017.01)
  *G06N 3/08* (2006.01)
(52) U.S. Cl.
  CPC .............. *G06T 2207/20084* (2013.01); *G06T 2207/30056* (2013.01); *G06T 2207/30064* (2013.01); *G06T 2207/30096* (2013.01)

(56) References Cited

OTHER PUBLICATIONS

Wang et al., "WGAN-Based Synthetic Minority Over-Sampling Technique: Improving Semantic Fine-Grained Classification for Lung Nodules in CT Images", IEEE Access, vol. 7, Jan. 30, 2019, 18450-18463.
Korkinof et al., "High-Resolution Mammogram Synthesis using Progressive Generative Adversarial Networks", Jul. 9, 2018, arXiv:1807.03401v1, 19 pgs.
Lau et al., "ScarGAN: Chained Generative Adversarial Networks to Simulate Pathological Tissue on Cardiovascular MR Scans", Aug. 14, 2018, arXiv:1808.04500v1, 12 pgs.
Wu et al., "Conditional Infilling GANs for Data Augmentation in Mammogram Classification", Aug. 24, 2018, arXiv:1807.08093v2, 8 pgs.
Frid-Adar, et al., "GAN-based Synthetic Medical Image Augmentation for Increased CNN Performance in Liver Lesion Classification", Mar. 3, 2018, IEEE, arXiv:1803.01229v1, 11 pgs.
Onishi et al., " Automated Pulmonary Nodule Classification in Computed Tomography Images Using a Deep Convolutional Neural Network Trained by Generative Adversarial Networks", Bio-Med Research International, 2019, 9 pgs.
Chuquicusma et al., "How to Fool Radiologists with Generative Adversarial Networks? A Visual Turing Test For Lung Cancer Diagnosis", 15th IEEE International Symposium on Biomedical Imaging (ISBI), Jan. 9, 2018, arXiv:1710.09762v2, 5 pgs.
Luthi et al., "Gaussian Process Morphable Models", IEEE Transactions on Pattern Analysis and Machine Intelligence, 2017, 14 pgs.
Arjovsky et al., "Wasserstein Generative Adversarial Networks", Jan. 2017, arXiv:1701.07875, 10 pgs.
Armato et al, "The Lung Image Database Consortium (LIDC) and Image Database Resource Initiative (IDRI): A Completed Reference Database of Lung Nodules on CT Scans", Medical Physics, 38 (2), Feb. 2011, pp. 915-931.
Chartsias et al., "Factorised Spatial Representation Learning: Application in Semi-Supervised Myocardial Segmentation", MICCAI Nov. 2, 2018, arXiv:1803.07031v2, 9 pgs.
Chen et al., "InfoGAN: Interpretable Representation Learning by Information Maximizing Generative Adversarial Nets", Jun. 2016, 30th Conference on Neural Information Processing Systems (NIPS), Barcelona, Spain, 9 pgs.
Di et al., "GP-GAN: Gender Preserving GAN for Synthesizing Faces from Landmarks", 24th International Conference on Pattern Recognition (ICPR), 2017, arXiv:1710.00962, 7 pgs.
Gulrajani et al., "Improved Training of Wasserstein GANs", May 29, 2017, arXiv:1704.00028v2, 19 pgs.
Hara et al., "Can Spatiotemporal 3D CNNs Retrace the History of 2D CNNs and ImageNet?", IEEE Conference on Computer Vision and Pattern Recognition, 2018, arXiv:1711.09577, pp. 6546-6555.
Higgins et al., "beta-vae: Learning Basic Visual Concepts with a Constrained Variational Framework", ICLR 2017, 13 pgs.
Hong et al., "Learning Hierarchical Semantic Image Manipulation through Structured Representations", Advances in Neural Information Processing Systems 31, arXiv:1808.07535v2, Aug. 28, 2018, 18 pgs.
Huang et al., "Densely Connected Convolutional Networks", Computer Vision Foundation, Jan. 28, 2018, arXiv:1608.06993v5, 9 pgs.

Rezende et al., "Stochastic Backpropagation and Approximate Inference in Deep Generative Models", Proceedings of the 31st Conference on Machine Learning, vol. 32, May 30, 2014, arXiv:1401.4082v3, 14 pgs.
Liu et al., "Decompose to manipulate: Manipulable Object Synthesis in 3D Medical Images with Structured Image Decomposition", Feb. 7, 2019, arXiv:1812.01737v2, 8 pgs.
Kay et al., "The Kinetics Human Action Video Dataset", May 19, 2017, arXiv:1705.06950v1, 22 pgs.
Kim et al., "Disentangling by Factorising", Proceedings of the 35th International Conference on Machine Learning, 2018, 6 pgs.
Kingma et al., "Semi-Supervised Learning with Deep Generative Models", Advances in Neural Information Processing Systems, arXiv:1406.5298v2, Oct. 31, 2014, 9 pgs.
Ma et al., "Disentangled Person Image Generation", The IEEE Conference on Computer Vision and Pattern Recognition (CVPR), Jan. 21, 2018, arXiv:1712.02621v2, 17 pgs.
Miyato et al., "Spectral Normalization for Generative Adversarial Networks", ICLR, Feb. 16, 2018, arXiv:1802.05957v1, 27 pgs.
Myronenko et al., "Point Set Registration: Coherent Point Drift", IEEE Transactions on Pattern Analysis and Machine Intelligence, vol. 32, Issue 12, May 15, 2009, arXiv:0905.2635v1, 14 pgs.
Niemeijer et al., "On Combining Computer-Aided Detection Systems", IEEE Transactions on Medical Imaging, vol. 30, Feb. 2011, pp. 215-223.
Reddi et al., "On the Convergence of Adam and Beyond", ICLR, 2018, 23 pgs.
Setio et al., "Validation, Comparison, and Combination of Algorithms for Automatic Detection of Pulmonary Nodules in Computed Tomography Images: The LUNA16 challenge", Medical Image Analysis, vol. 42, Jul. 15, 2017, arXiv:1612.08012v4, 17 pgs.
Shin et al., "Medical Image Synthesis for Data Augmentation and Anonymization Using Generative Adversarial Networks", Sep. 13, 2018, 2018 Workshop on Simulation and Synthesis in Medical Imaging, arXiv:1807.10225v2, Jul. 2018,11 pgs.
Sun et al., "Natural and Effective Obfuscation by Head Inpainting", Computer Vision and Pattern Recognition, Nov. 24, 2017, arXiv:1711.09001v1, 15 pgs.
Aberle et al., "The National Lung Screening Trial: Overview and Study Design", Radiology, vol. 258: No. 1, Jan. 2011, 12 pgs.
Tran et al., "Disentangled Representation Learning GAN for Pose-Invariant Face Recognition", The IEEE Conference on Computer Vision and Pattern Recognition, 2017, 11 pgs.
Wang et al., "Automated Pulmonary Nodule Detection: High Sensitivity with Few Candidates", MICCAI 2018, pp. 759-767.
Zhao et al., "Multi-View Image Generation from a Single-View", 2018 ACM Multimedia Conference on Multimedia Conference, New York, 9 pgs.
Clark et al., "The Cancer Imaging Archive (TCIA): Maintaining and Operating a Public Information Repository", J Digit Imaging, 2013, Springer, pp. 1045-1057.
He et al., "Deep Residual Learning for Image Recognition", 2016 IEEE Conference on Computer Vision and Pattern Recognition, pp. 770-778.
Xie et al., "Aggregated Residual Transformations for Deep Neural Networks", 2017 IEEE Conference on Computer Vision and Pattern Recognition, arXiv:1611.05431v2, Apr. 11, 2017, 10 pgs.
Qin et al. "Pulmonary nodule segmentation with CT sample synthesis using adversarial networks." Medical physics 46.3 (2019): 1218-1229.
Macmahon et al., "Guidelines for Management of Small Pulmonary Nodules Detected on CT Scans: A Statement from the Fleischner Society", Radiology, 2005, pp. 395-400.
Yang et al., "Class-Aware Adversarial Lung Nodules Synthesis in CT Images", Dec. 28, 2018, arXiv:1812.11204v1, 5 pgs.
Carreira et al., "Quo Vadis, Action Recognition? A New Model and the Kinetics Dataset", IEEE Conference on Computer Vision and Pattern Recognition (CVPR), Feb. 12, 2018, arXiv:1705.07750v3, 10 pgs.
Yu et al., "Generative Image Inpainting with Contextual Attention", IEEE, Mar. 21, 2018, arXiv:1801.07892v2, 15 pgs.

(56) References Cited

OTHER PUBLICATIONS

Choi et al., "StarGAN: Unified Generative Adversarial Networks for Multi-Domain Image-to-Image Translation", Nov. 24, 2017, arXiv:1711.09020v1, 15 pgs.

Xu et al., "Correlation via synthesis: end-to-end nodule image generation and radiogenomic map learning based on generative adversarial network", arXiv preprint arXiv:1907.03728, 2019.

Yaguchi et al., "3D fully convolutional network-based segmentation of lung nodules in CT images with a clinically inspired data synthesis method", Medical Imaging 2019: Computer-Aided Diagnosis. vol. 10950, International Society for Optics and Photonics, 2019.

Wang et al., "Data Synthesize for Semantic Fine-Grained Prediction of Lung Nodule in CT Images", ISEE Conference Abstracts, vol. 2018, No. 1, 2018.

Shin et al., "Deep Convolutional Neural Networks for Computer-Aided Detection: CNN Architectures, Dataset Characteristics and Transfer Learning", IEEE Transactions on Medical Imaging, vol. 35, No. 5, May 2016, pp. 1285-1298.

U.S. Appl. No. 16/445,435, filed Jun. 19, 2019.

Partial European Search Report dated Oct. 29, 2020 in corresponding European Patent Application No. 20195742.0.

Hang Dai: "Statistical Modelling of Craniofacial Shape" In: "Doctoral dissertation; Computer Science"; Sep. 27, 2018 (Sep. 27, 2018); University of York; XP055741077; pp. 1-182; sections 2.8.2 "Gaussian Process Morphable Model" and 2.8.3 "Statistical Modelling using auto-encoder"; pp. 35 to 36.

Ciompi, et al: "Towards automatic pulmonary nodule management in lung cancer screening with deep learning"; Obesity; Fitness & Wellness Week; May 6, 2017 (May 6, 2017); p. 429; XP055431761; Retrieved from the Internet: URL:https://arxiv.org/pdf/1610.09157.pdf.

\* cited by examiner

900

902
904
906

1000

1002
1004
1006

MANIPULABLE OBJECT SYNTHESIS IN 3D MEDICAL IMAGES WITH STRUCTURED IMAGE DECOMPOSITION

TECHNICAL FIELD

The present invention relates generally to manipulable object synthesis in 3D medical images with structured image decomposition, and more particularly to lung nodule synthesis with structured image decomposition for rare sample augmentation.

BACKGROUND

The performance of deep learning networks for performing medical image analysis tasks is constrained by the amount of high-quality annotated images that is available. Large-scale datasets of such high-quality annotated images are important for the training and testing of deep learning networks in order to reduce variance of the trained networks in supervised learning, as well as to provide a reliable estimate of their long-term performance after deployment. However, most medical image datasets only scale from hundreds to thousands of patients acquired from a few clinical imaging sites. Additionally, networks trained for medical diagnostic applications typically require medical images annotated by annotators having years of medical training, making annotation of such medical images time consuming and financially expensive. Further, the distribution of such medical images is highly biased towards only a small portion of the global population, and rare abnormalities may have too few exemplars in the training dataset to generalize well for deployment.

Conventionally, adversarial image synthesis has been proposed for augmenting image datasets for training and testing networks for performing medical image analysis tasks. However, such conventional approaches are not able to manipulate properties (e.g., shapes, sizes, intensities) of the synthesized object.

BRIEF SUMMARY OF THE INVENTION

In accordance with one or more embodiments, systems and methods for generating synthesized images are provided. An input medical image patch, a segmentation mask, a vector of appearance related parameters, and manipulable properties are received. A synthesized medical image patch including a synthesized nodule is generated based on the input medical image patch, the segmentation mask, the vector of appearance related parameters, and the manipulable properties using a trained object synthesis network. The synthesized nodule is synthesized according to the manipulable properties. The synthesized medical image patch is output.

In one embodiment, the manipulable properties include a nodule intensity based label to define an appearance of the synthesized nodule as being solid, part-solid, ground glass opacity, fully calcified, or partially calcified and/or a texture and boundary based label to define an appearance of the synthesized nodule as being spiculated or non-spiculated. In one embodiment, the synthesized medical image patch may be generated by concatenating a vector representing the manipulable properties with the vector of appearance related parameters. In one embodiment, the segmentation mask is generated to have a size and a shape using a Gaussian process morphable model by defining eigenvectors of Gaussian process morphable model, and the synthesized nodule is synthesized to have a size and a shape according to the size and the shape of the segmentation mask.

In one embodiment, the trained object synthesis network comprises a reconstruct network and a refine network. The trained object synthesis network is trained by training 1) a decompose network to decompose a particular image patch comprising a nodule into a particular segmentation mask and a particular vector of appearance related parameters and 2) the reconstruct network and the refine network to reconstruct the particular image patch based on the particular segmentation mask and the particular vector of appearance related parameters, and refining the refine network based on a random segmentation mask and a random vector of appearance related parameters using the trained reconstruct network. The refine network may be refined with adversarial loss using a local discriminator applied to a region surrounding the nodule in the particular image patch and a context discriminator applied to a larger region in the particular image patch.

In one embodiment, a reinforcement learning agent is trained for determining manipulable properties. The manipulable properties may be determined using the reinforcement learning agent. A detector or classifier may be applied to detect or classify the synthesized medical image patch. The reinforcement learning agent is penalized if the detector or classifier is able to detect or classify the synthesized medical image patch and rewarded if the detector or classifier is not able to detect or classify the synthesized medical image patch.

In one embodiment, a machine learning network may be trained for detecting or segmenting a nodule in an target medical image patch based on the synthesized medical image patch.

These and other advantages of the invention will be apparent to those of ordinary skill in the art by reference to the following detailed description and the accompanying drawings.

DETAILED DESCRIPTION

The present invention generally relates to methods and systems for manipulable object synthesis in 3D medical images with structured image decomposition. Embodiments of the present invention are described herein to give a visual understanding of such methods and systems for manipulable object synthesis in 3D medical images with structured image decomposition. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Further, it should be understood that while the embodiments discussed herein may be discussed with respect to nodule synthesis in 3D medical images, the present invention is not so limited. Embodiments of the present invention may be applied for synthesizing any type of object in any type of image. In one example, the synthesized object is a lesion, such as a liver lesion or tumor.

Figure 1:
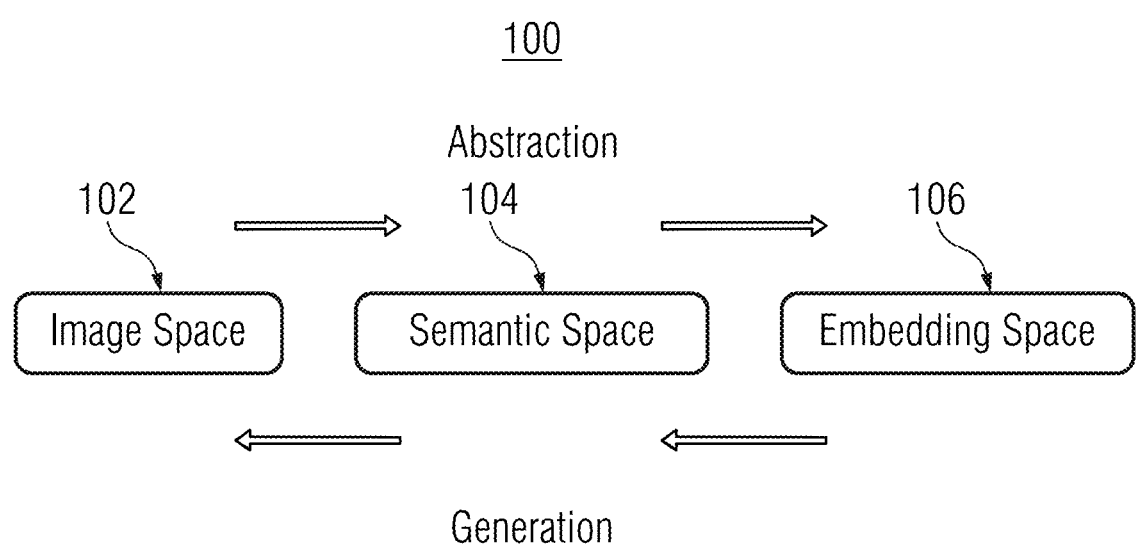
FIG. 1 shows a high-level formulation of an image synthesis problem.

Embodiments of the invention generally relate to manipulable synthesis of images of nodules. The image synthesis problem can be represented by high-level formulation 100 of FIG. 1. In formulation 100, image space 102 represents the raw pixels (or voxels) of an image acquired in Euclidian space by an imaging device, semantic space 104 represents the abstracted labels assigned to each pixel (e.g., from segmentation), and embedding space 106 represents low-dimensional vectors in the Euclidian space. As shown in FIG. 1, an image may be abstracted or decomposed from image space 102 to semantic space 104 to embedding space 106, and generated or reconstructed from embedding space 106 to semantic space 104 to image space 102. Advantageously, by decomposing the image to embedding space 106, the representation of the image in embedding space 106 may be manipulated and the manipulated representation may be reconstructed in image space 102 to thereby provide for manipulable synthesis of nodules.

Figure 2:
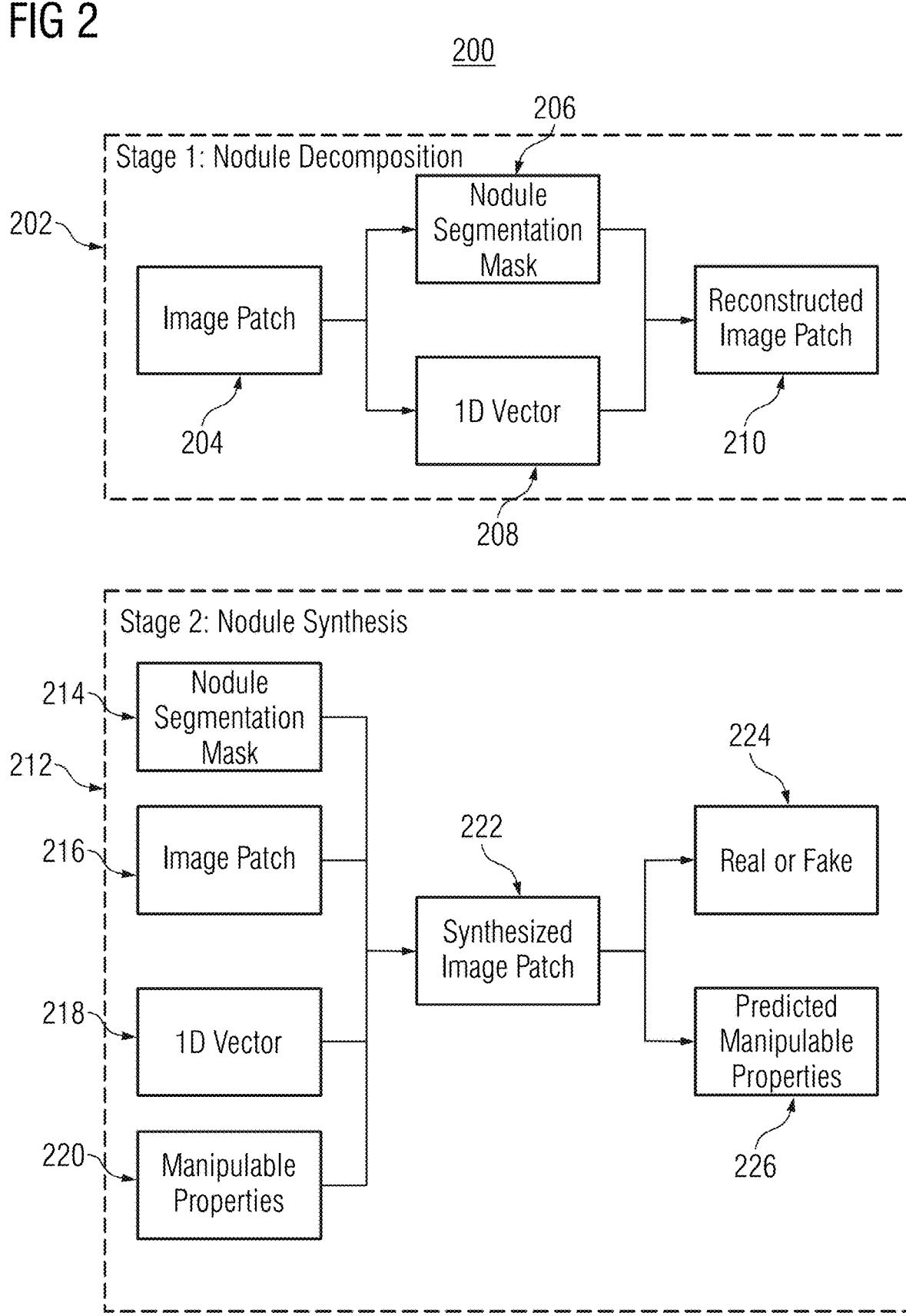
FIG. 2 shows a high-level framework for training an object synthesis network.

FIG. 2 shows a high-level framework 200 for training an object synthesis network, in accordance with one or more embodiments. Framework 200 includes Stage 1 202 and Stage 2 212. In one embodiment, framework 200 for training the object synthesis network may be implemented according to method 400 of FIG. 4, described in detail below. The network architecture for training the object synthesis network during Stage 1 202 is described in further detail below with respect to FIG. 6 and the network architecture for training the object synthesis network during Stage 2 212 is described in further detail below with respect to FIG. 7, in accordance with one embodiment.

During Stage 1 202, the object synthesis network is trained for nodule decomposition. As shown in FIG. 2, the object synthesis network is trained to decompose image patch 204 into nodule segmentation mask 206 and 1D (one dimensional) vector 208, and to reconstruct image patch 204 as reconstructed image patch 210 from nodule segmentation mask 206 and 1D vector 208. Nodule segmentation mask 206 comprises a binary segmentation mask of the nodule depicted in image patch 204 and 1D vector 208 comprises residual information relating to nodule intensity, texture, boundary appearance, and other information of the nodule depicted in image patch 204. Decomposition of the nodule depicted in image patch 204 into nodule segmentation mask 206 and 1D vector 208 is illustratively shown in FIG. 3 below, in accordance with one embodiment.

During Stage 2 212, the object synthesis network is refined for nodule synthesis. As shown in FIG. 2, synthesized image patch 222 is generated based on nodule segmentation mask 214, an image patch 216, a 1D vector 218 of random residual information, and manipulable properties 220. In one embodiment, a synthesized nodule is synthesized based on nodule segmentation mask 214, 1D vector 218, and manipulable properties 220, and overlaid on image patch 216, which initially did not depict nodules. Manipulable properties 220 allow for manipulation of the appearance of the synthesized nodule in synthesized image patch 222. In one embodiment, manipulable properties 220 are discrete labels to define a nodule intensity or a texture and boundary of the nodule to be synthesized. In one embodiment, the size and shape of the nodule to be synthesized can be manipulated by manipulating the generation of nodule segmentation mask 214. The object synthesis network is trained with adversarial loss by attempting to classify synthesized image patch 222 as real or fake 224 and to determine predicted manipulable properties 226.

Once trained, the trained object synthesis network may be applied during an online or testing stage to generate image patches with synthesized nodules according to the manipulable properties. Advantageously, such manipulability allows for the reproduction of variability of semantically meaningful features that are clinically observed but are not captured in real world datasets, and for the over-sampling of realistic but challenging samples where system performance is more clinically important. Datasets generated with such manipulability may be used to train machine learning networks for performing medical image analysis tasks (e.g., lung nodule detection, lung nodule segmentation, etc.).

Figure 3:
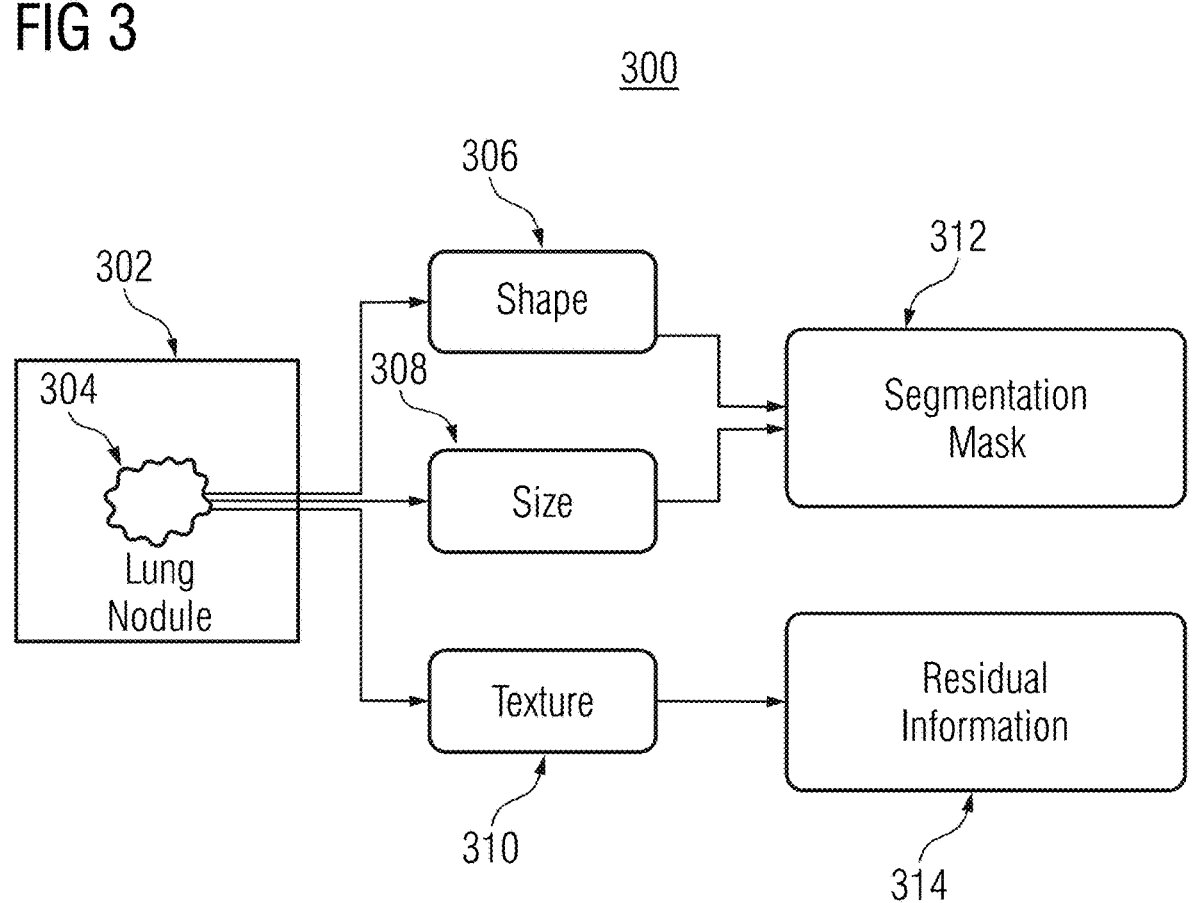
FIG. 3 shows a high level framework for decomposition of a lung nodule in a nodule patch.

FIG. 3 shows a high level framework 300 for decomposition of a lung nodule in a nodule patch, in accordance with one or more embodiments. In one embodiment, framework 300 illustrates the decomposition of nodule patch 204 into nodule segmentation mask 206 and 1D vector 208 in FIG. 2. In framework 300, a nodule patch 302 from a 3D CT image is shown comprising lung nodule 304. Lung nodule 304 is decomposed into shape modeling parameters of shape 306 and size 308 and appearance related parameters of texture 310. Other shape modeling and appearance related parameters are also contemplated. The shape modeling parameters of shape 306 and size 308 of lung nodule 304 are represented by binary segmentation mask 312. The appearance related parameters of texture 310 is represented as residual information 314.

Figure 4:
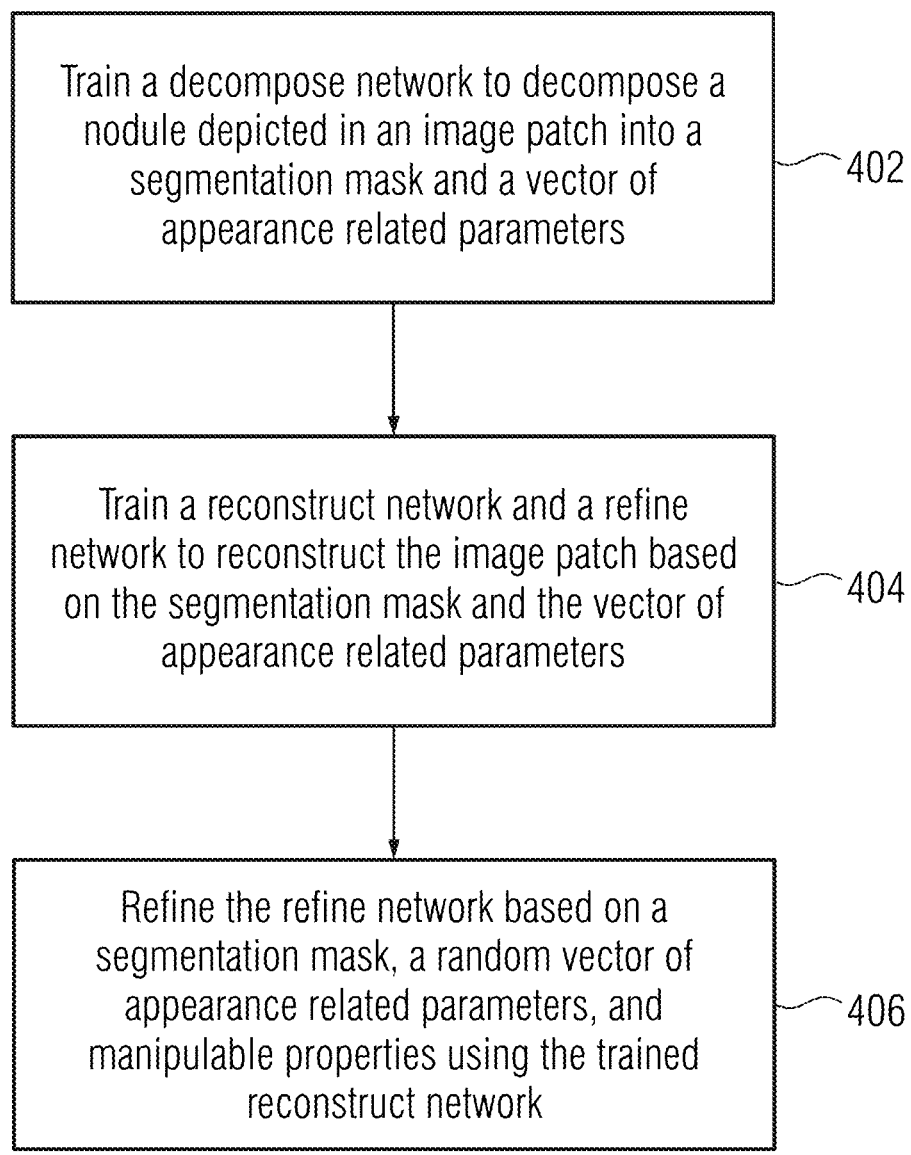
FIG. 4 shows a method for training an object synthesis network.
Figure 6:
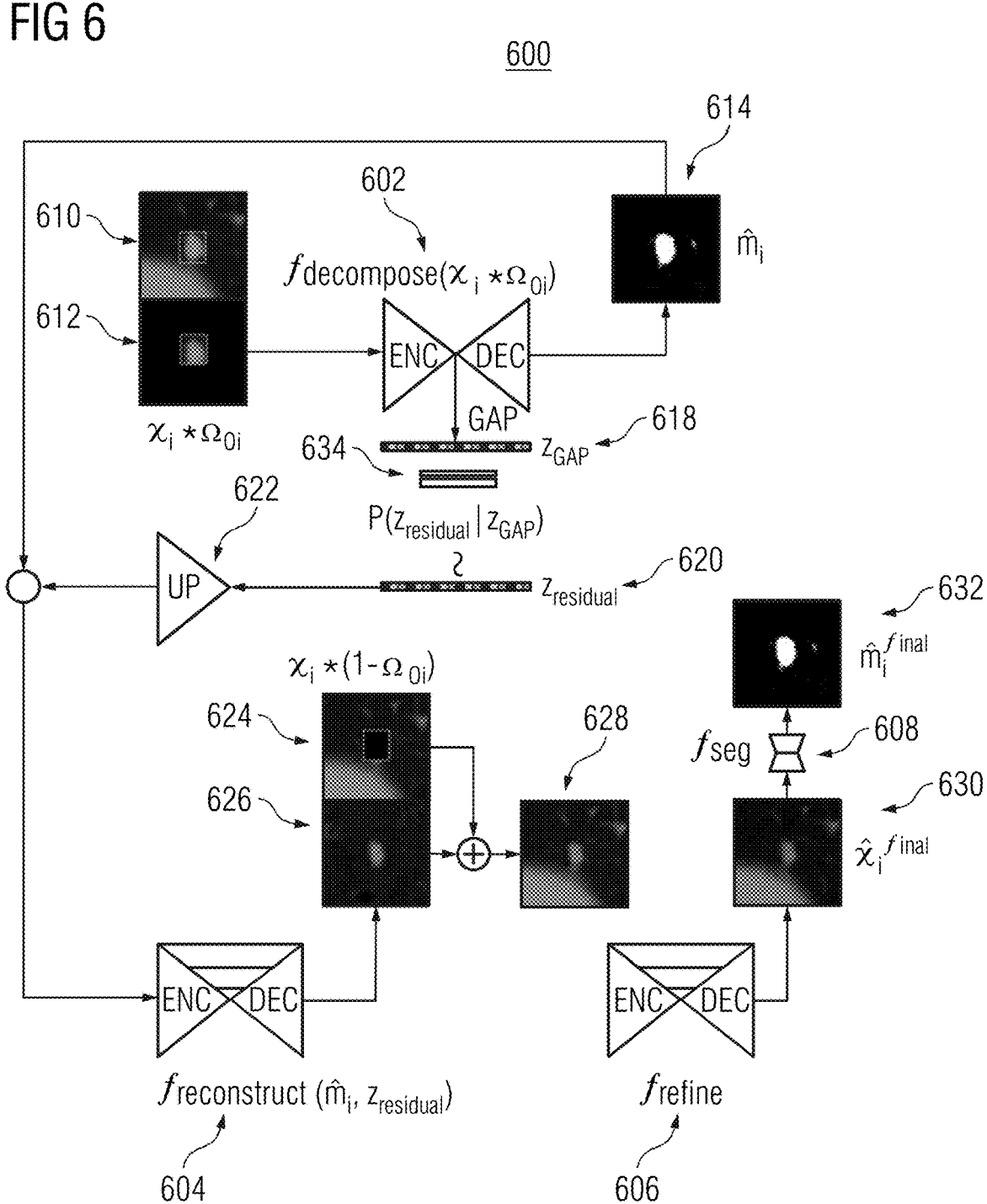
FIG. 6 shows a network architecture for training an object synthesis network for nodule decomposition.
Figure 7:
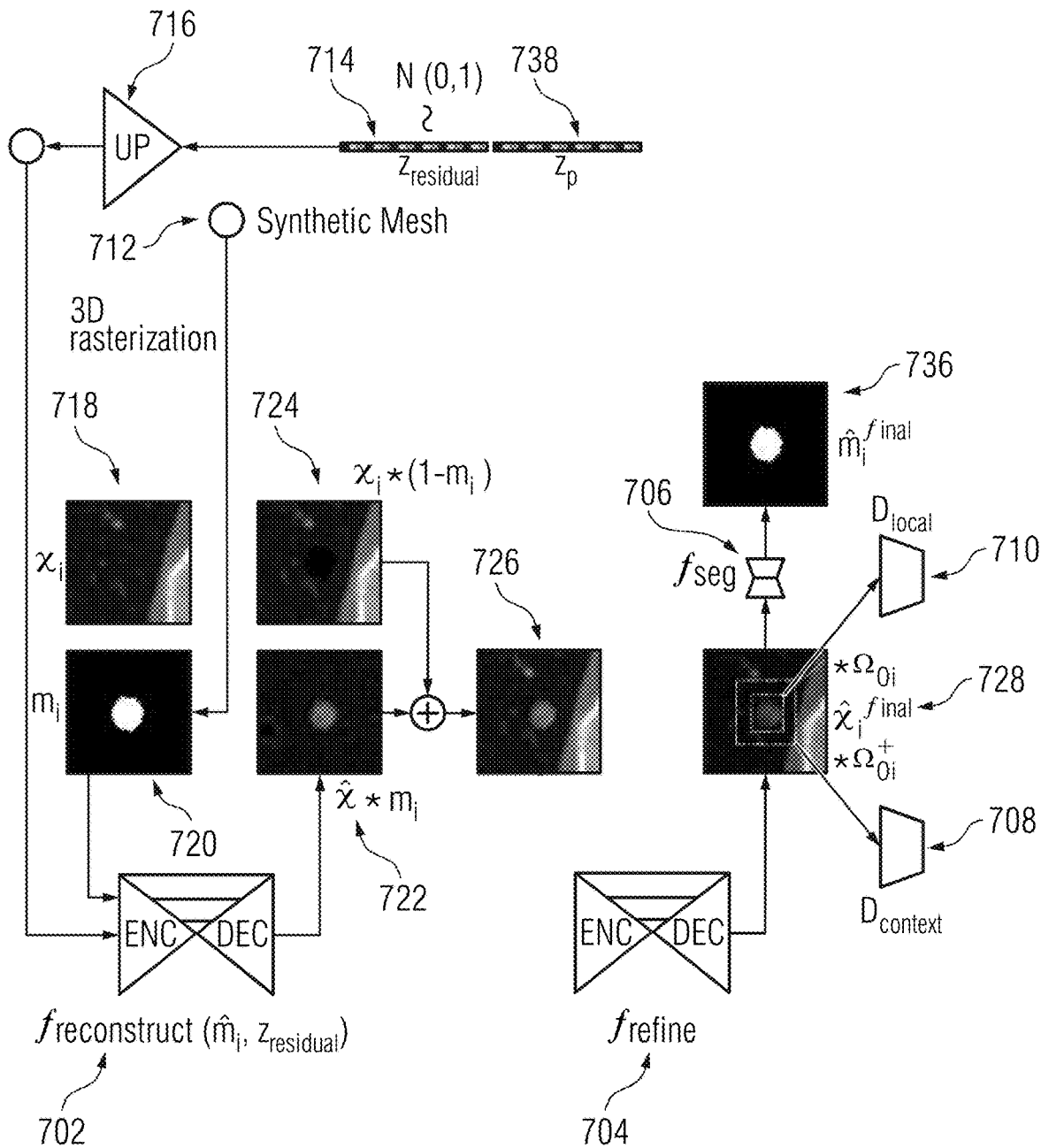
FIG. 7 shows a network architecture for training an object synthesis network for nodule synthesis.

FIG. 4 shows a method 400 for training an object synthesis network, in accordance with one or more embodiments. The steps of method 400 may be performed by any suitable computing device, such as, e.g., computer 1402 of FIG. 14. The steps of method 400 are performed during an offline or training stage to train the object synthesis network. In one embodiment, steps 402-404 of method 400 correspond to Stage 1 202 of FIG. 2 for training the object synthesis network for nodule decomposition and step 406 of method 400 corresponds to Stage 2 212 for refining the object synthesis network for nodule synthesis. The network architecture for training the object synthesis network for nodule decomposition (i.e., Stage 1 202) is shown in FIG. 6 and the network architecture for refining the object synthesis network for nodule synthesis (i.e., Stage 2, 212) is shown in FIG. 7, in accordance with one embodiment. The object synthesis network comprises a plurality of machine learning networks, including a decompose network, a reconstruct network, and a refine network.

At step 402, the decompose network is trained to decompose a nodule depicted in an image patch into a segmentation mask and a vector of appearance related parameters. The segmentation mask is a binary segmentation mask of the nodule depicted in the image patch representing shape modeling parameters (e.g., shape and size) of the nodule. The vector of appearance related parameters is a 1D vector of residual information (residual after decomposing the image patch into the segmentation mask) representing, e.g., intensity, texture, boundary appearance, nodule type, etc. of the nodule.

At step 404, the reconstruct network and the refine network are trained to reconstruct the image patch based on the segmentation mask and the vector of appearance related parameters. In particular, the reconstruct network receives the segmentation mask and the vector of appearance related parameters and generates a synthesized nodule, which is fused with the image patch. The fused image patch is input into the refine network to blend the synthesized nodule with the image patch.

At step 406, the refine network is refined based on a segmentation mask, a random vector of appearance related parameters, and manipulable properties. The refine network is refined with adversarial loss using a local discriminator applied on the synthesized nodule and a context discriminator applied on a larger region of the output image to generate realistic looking images. The trained reconstruct network and the trained refine network can be applied during an online or testing stage to generate image patches with synthesized nodules thereon.

Figure 5:
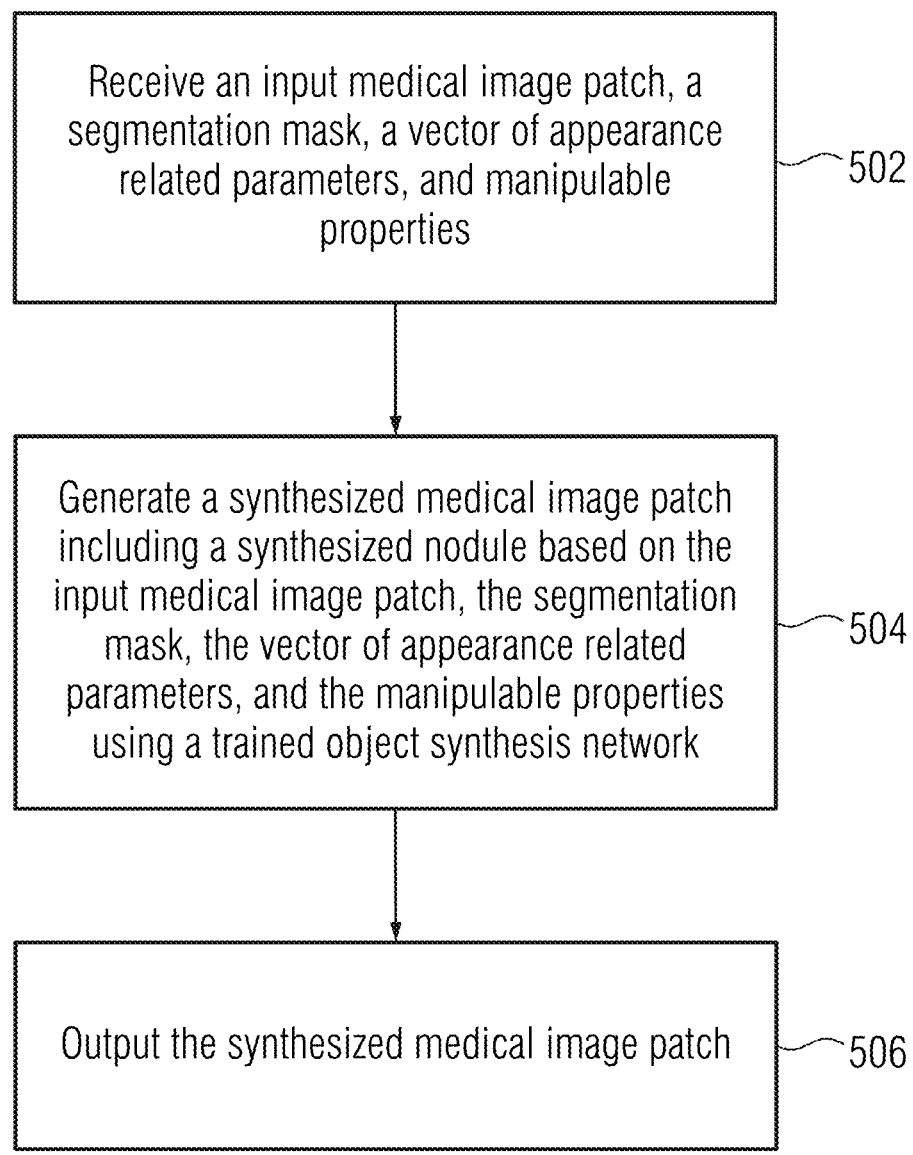
FIG. 5 shows a method for applying a trained object synthesis network to generate synthesized medical image patches having synthesized nodules thereon.

FIG. 5 shows a method 500 for applying a trained object synthesis network to generate synthesized medical image patches having synthesized nodules thereon, in accordance with one or more embodiments. The steps of method 500 may be performed by any suitable computing device, such as, e.g., computer 1402 of FIG. 14. The steps of method 500 are performed during an online or testing stage using a trained object synthesis network. In one embodiment, the trained object synthesis network is the trained reconstruct network and the trained refine network trained according to method 400 of FIG. 4.

At step 502, an input medical image patch, a segmentation mask, a vector of appearance related parameters (i.e., non-shape related, residual information), and manipulable properties are received. The input medical image patch does not depict nodules. In one embodiment, the input medical image patch is a 3D computed tomography (CT) medical image patch, however the input medical image patch of any suitable modality, such as, e.g., DynaCT, x-ray, magnetic resonance imaging (MRI), ultrasound (US), single-photon emission computed tomography (SPECT), positron emission tomography (PET), etc., and may be two dimensional or three dimensional. The initial medical image patch may be of any suitable (e.g., predetermined) dimension. For example, the initial medical image patch may be a 64×64×64 voxel patch extracted from a 3D CT medical image (or a 64×64 pixel patch extracted from a 2D CT medical image). In another example, the initial medical image patch is the entire medical image.

The manipulable properties are parameters defining the nodule to be generated. In one embodiment, the manipulable properties are discrete labels that are, e.g., manually labelled by a user according to a desired appearance of the nodule to be synthesized. In one example, the manipulating properties include a nodule intensity based label to define the nodule to be synthesized as being solid, part-solid, ground glass opacity, fully calcified, or partially calcified. In another example, the manipulating properties may include a texture and boundary based label to define the nodule to be synthesized as spiculated or non-spiculated. Labels defining other properties of the nodule to be synthesized, such as, e.g., malignancy, are also contemplated.

In one embodiment, the size and shape of the nodule to be synthesized can be manipulated by manipulating the generation of the segmentation mask. In one embodiment, the segmentation mask may be generated by Gaussian process morphable modelling (GPMM). The shapes of the segmentation mask generated by the GPMM model may be controlled by changing the eigenvalues in the GPMM model. Different eigenvectors represent different properties of the shapes of the segmentation masks generated by the GPMM model. Accordingly, defining the eigenvalues of the corresponding vectors can manipulate the shapes of the segmentation mask to be generated.

At step 504, a synthesized medical image patch including a synthesized nodule is generated based on the input medical image patch, the segmentation mask, the vector of appearance related parameters, and the manipulable properties using a trained object synthesis network. The trained object synthesis comprises one or more machine learning networks. Any suitable machine learning network may be employed, such as, e.g., neural networks. The synthesized nodule is synthesized according to the manipulable properties. In one embodiment, to manipulate the nodule to be synthesized, a 1D binarized vector representing the manipulable properties is concatenated with the vector of appearance related parameters.

At step 506, the synthesized medical image patch is output. For example, the synthesized medical image patch can be output by displaying the synthesized medical image patch on a display device of a computer system (computer 1402 of FIG. 14), storing the synthesized medical image patch on a memory or storage of a computer system (computer 1402 of FIG. 14), or by transmitting the synthesized medical image patch to a remote computer system. In one embodiment, the synthesized medical image patch is output to a database as part of a training dataset for training a machine learning model.

It should be understood that method 500 may be repeatedly for any number of initial medical image patches to generate a plurality of synthesized medical image patches. The plurality of synthesized medical image patches may be used to, e.g., augment a training dataset of real medical image patches. In one embodiment, the synthesized medical image patch may be used as part of a training dataset to train a machine learning network for classifying pulmonary nodules, for detecting pulmonary nodules, for segmenting pulmonary nodules, or for performing any other image analysis task.

FIG. 6 shows a network architecture 600 for training an object synthesis network for nodule decomposition, in accordance with one or more embodiments. Network architecture 600 corresponds to a first training stage (i.e., Stage 1 202 of FIG. 2) for training the object synthesis network for nodule decomposition. The object synthesis network one includes one or more machine learning networks, including a decompose network $f_{decompose}$ 602, a reconstruct network $f_{reconstruct}$ 604, a refine network $f_{refine}$ 606, and a segmentation network $f_{seg}$ 608.

The problem of generating a nodule (or other object of interest) o in an image patch x is formulated as an invertible distribution matching problem:

$$z \sim q_{forward}(z|o) \qquad \text{(Equation 1)}$$

$$o \sim p_{inverse}(o|z) \qquad \text{(Equation 2)}$$

where z is a set of latent variables that could represent the nodule, q is the decompose network $f_{decompose}$ 602, and p is the reconstruct network 604. To fit the generated nodule o in a real world image $I_i$, an additional transform is performed to blend the nodule o into the background of the real world image $I_i$, making the generated image I indistinguishable from real world images having similar nodules:

$$I \sim r(I|o \odot I_i) \qquad \text{(Equation 3)}$$

where $\odot$ defines the operation of fusing the generated nodule o with a real world image $I_i$.

To make z manipulable and interpretable, z is decomposed as $z=\{Z_{shape}, Z_{residual}\}$, where $Z_{shape}$ comprises shape modeling parameters that can be defined with known properties (e.g., size and shape) and $Z_{residual}$ comprises residual information representing shape related parameters of the nodule (e.g., intensity, texture, boundary appearance, nodule type).

Given an initial training image patch $x_i$ 610 depicting a nodule $o_i$ and an initial segmentation mask $m_i$, decompose network $f_{decompose}$ 602 is trained to decompose the masked training image patch $x_i * \Omega_{oi}$ 612 into segmentation mask $\hat{m}_i$ 614 and a 1D vector of appearance related parameters $Z_{residual}$ 620 as follows:

$$\hat{m}_i, Z_{residual} = f_{decompose}(x_i * \Omega_{oi}) \qquad \text{(Equation 4)}$$

$$\hat{x}_i * \Omega_{oi} = f_{reconstruct}(\hat{m}_i, Z_{residual}) \qquad \text{(Equation 5)}$$

where $f_{decompose}(\cdot)$ 602 has an auto-encoder like architecture with a 3D hour-glass network which outputs binary segmentation mask $\hat{m}_i$ 614 having the same size as the initial segmentation mask $m_i$, the operator * denotes the Hadamard product, and $\Omega_{oi}$ is the bounding box region surrounding nodule $o_i$. The binary dice loss $L_{dice}$ is used to optimize the network to segment the correct segmentation masks.

By applying global average pooling (GAP) on residual output features of decompose network $f_{decompose}$ 602, a 1D vector $Z_{GAP}$ 618 is obtained. 1D vector $Z_{GAP}$ 618 is forwarded to two fully connected layers $f_{dist}$ 634 to output the distribution parameters of $P(Z_{residual}|f_{dist}(Z_{GAP}))$ where $Z_{residual}$ 620 is sampled from. $P(Z_{residual}|f_{dist}(Z_{GAP}))$ gives a smooth manifold for randomly sampling $Z_{residual}$ 620 for training Stage 2 (i.e., Stage 2 212 of FIG. 2) and the inference stage.

The input of reconstruct network $f_{reconstruct}$ 604 is the permuted B×D×1×1 tensor of $Z_{residual}$ 620, where B and D are batch size and feature dimension, respectively. $Z_{residual}$ 620 is progressively upsampled with upsampling layers 622 (e.g., 3D 3×3 convolutional blocks with stride 1) until the resampled features are the same size as segmentation mask $\hat{m}_i$ 614. The upsampled features are then concatenated with segmentation mask $\hat{m}_i$ 614 and fed into a Res-UNet of reconstruct network $f_{reconstruct}$ 604 to output the masked area of the initial training image patch $\hat{x}_i * \Omega_{oi}$ 626, where $\Omega_{oi}$ is the rectangular bounding box surrounding nodule $o_i$. Reconstruct network $f_{reconstruct}$ 604 reconstructs the nodule within bounding box $\Omega_{oi}$ and adds the reconstructed nodule to the background patch $\hat{x}_i * (1-\Omega_{oi})$ 624 to form the initial in-painting.

To blend the reconstructed nodule in bounding box $\Omega_{oi}$ within the context of background patch $\hat{x}_i * (1-\Omega_{oi})$ 624, bounding box $\Omega_{oi}$ and background patch $\hat{x}_i * (1-\Omega_{oi})$ 624 are fused (e.g., feature summation) into a fused patch 628, which is input into the refine network $f_{refine}$ 606 to reconstruct the final reconstructed image patch $\hat{x}_i^{final}$ 630. A segmentation network $f_{seg}$ 608 is applied to segment the final segmentation mask $\hat{m}_i^{final}$ 632 from the final reconstructed patch $\hat{x}_i^{final}$ to reproduce input segmentation mask $m_i$, regularizing refine network $f_{refine}$ 606 to preserve the original shape. The reconstruction loss is summarized as follows:

$$L_{local} = |\hat{x}_i * \Omega_{Oi} - x_i^* * \Omega_{Oi}| \qquad \text{(Equation 6)}$$

$$L_{global} = |f_{refine}(\hat{x}_i * \Omega_{Oi} - \hat{x}_i * (1 - \Omega_{Oi})) - x_i| \qquad \text{(Equation 7)}$$

$$L_{dice} = \frac{2|\hat{m}_i * m_i|}{\|\hat{m}_i\|_2^2 + \|m_i\|_2^2} + \frac{2|\hat{m}_i^{final} * m_i|}{\|\hat{m}_i^{final}\|_2^2 + \|m_i\|_2^2} \qquad \text{(Equation 8)}$$

$$L_{recon} = \lambda_1 L_{local} + \lambda_2 L_{global} + \lambda_3 L_{dice} - \lambda_{D_{KL}} D_{KL} \qquad \text{(Equation 9)}$$

where $D_{KL}=D[N(\mu(x_i), \sigma(x_i))\|N(0,1)]$ is the KL divergence that regularizes the distribution $P(Z_{residual}|Z_{GAP})$ so that $Z_{residual}$ can be sampled from a standard normal distribution $N(0,1)$.

FIG. 7 shows a network architecture 700 for training an object synthesis network for nodule synthesis, in accordance with one or more embodiments. Network architecture 700 corresponds to a second training stage (i.e., Stage 2 212 of FIG. 2) for training the object synthesis network for nodule synthesis. In one embodiment, network architecture 700 is for further refining the object synthesis network that was previously trained for nodule decomposition according to network architecture 600 of FIG. 6, and the reconstruct network $f_{reconstruct}$ 604, the refine network $f_{refine}$ 606, and the segmentation network $f_{seg}$ 608 of FIG. 6 are reconstruct network $f_{reconstruct}$ 702, refine network $f_{refine}$ 704, and segmentation network $f_{seg}$ 706 of FIG. 7, respectively. The weights of the reconstruct network $f_{reconstruct}$ 702, refine network $f_{refine}$ 704, and segmentation network $f_{seg}$ 706 learned according to network architecture 600 of FIG. 6 are preserved for fine-tuning the object synthesis network for synthesizing nodules at random locations of an image. The decompose network $f_{decompose}$ 602 was used in network architecture 600 of FIG. 6 for training the reconstruct network $f_{reconstruct}$ 604 to learn the latent embedding and segmentation mask of an image object and is discarded in network architecture 700.

During the second training stage, random negative initial training image patches $x_i$ 718 that do not include nodules are used as the input background patches. Synthesized segmentation masks $m_i$ 720 are generated with different sizes and shapes. In one embodiment, the segmentation masks $m_i$ 720 are generated using GPMM to build a statistical shape model using manually annotated nodule masks. Only the segmentation of a subset of the training dataset is annotated to build the GPMM model. The 3D mesh surfaces of the labelled nodule masks are obtained using the marching cube algorithm. A GGPM based shape model is then built with the 3D mesh surfaces. Eigen vectors in the GGPM model represent different properties of the 3D shapes to be generated. Segmentation masks $m_i$ 720 with arbitrary shapes and sizes can be generated by manipulating the eigenvalues in the GGPM model. The sampled 3D surfaces can be further augmented by random scaling, rotating, flipping, etc. before it is rasterized into segmentation masks $m_i$ 720.

Initial training image patches $x_i$ 718 and synthesized segmentation masks $m_i$ 720 are fed into reconstruct network $f_{reconstruct}$ 702 together with a concatenated 1D vector comprising a random vector $Z_{residual}$ 714 sampled from the standard normal distribution N(0,1) and manipulating properties $z_p$ 738. The concatenated 1D vector is progressively upsampled with upsampling layers 716 until the sampled features are the same size as synthesized segmentation mask $\hat{m}_i$ 720. Reconstruct network $f_{reconstruct}$ 702 outputs a masked image patch $\hat{x}^* m_i$ 722 and a masked background patch $x_i^*(1-m_i)$ 724, which are fused (e.g., feature summation) to form a coarse synthetic image patch 726. Different from the first training stage for nodule decomposition (shown in network architecture 600 of FIG. 6), the synthesized segmentation mask $\hat{m}_i$ 720 is used here to mask out the background (instead of a square or rectangular mask) because the mask $\hat{m}_i$ 720 is more reliable at this stage and the final synthesized image could otherwise suffer from unnecessary artefacts at the squared mask boundaries.

The coarse synthetic image patch 726 is fed into refine network $f_{refine}$ 704 to blend the synthetic nodule in masked patch $\hat{x}^* m_i$ 722 into the context of the masked background patch $x_i^*(1-m_i)$ 724 to obtain a final reconstructed image patch $\hat{x}_i^{final}$ 728. Two Wasserstein generative adversarial network (WGAN) discriminators, $D_{local}$ 710 and $D_{context}$ 708, are used on the final reconstructed image patch $\hat{x}_i^{final}$ 728 to improve the appearance of the synthetic nodule. Discriminator $D_{local}$ 710 is applied to the region $\hat{x}_i^{final} * \Omega_{oi}$ representing the masked area (e.g., a bounding box) $\Omega_{oi}$ surrounding the synthetic nodule in final reconstructed image patch $\hat{x}_i^{final}$ 728 and discriminator $D_{context}$ 708 is applied to a larger region $\hat{x}_i^{final} * \Omega_{oi}^+$ representing a relatively larger masked area $\Omega_{oi}^+$ surrounding the synthetic nodule in the final reconstructed patch $\hat{x}_i^{final}$ 728. Discriminators $D_{local}$ 710 and $D_{context}$ 708 aim to distinguish between reconstructed (i.e., synthesized) image patches and real image patches to discriminate if the synthetic nodules have been realistically blended with the masked background patch $x_i^*(1-m_i)$ 724. The weights of reconstruct network $f_{reconstruct}$ 702 are frozen throughout this stage. Discriminators $D_{local}$ 710 and $D_{context}$ 708 are built with a small DenseNet with spectral normalization in each convolutional layer. A segmentation network $f_{seg}$ 706 is applied to segment the final segmentation mask $\hat{m}_i^{final}$ 736 from the final reconstructed patch $\hat{x}_i^{final}$ 728 to reproduce input segmentation mask $m_i$ 720, regularizing refine network $f_{refine}$ 704 to preserve the original shape.

The objective function for the generator (i.e., reconstruct network $f_{reconstruct}$ 702 and refine network $f_{refine}$ 704) can be summarized as follows:

$$L_G = \omega_1 L_{local} + \omega_2 L_{global} + \omega_3 L_{dice} - \lambda_D L_D \quad \text{(Equation 10)}$$

where $L_{global}$ is defined in Equation 7 and $L_{dice}$ is defined in Equation 8. $L_{local}$ is the L1 loss between the surrounding areas $\Omega_s = \text{Dilate}(m_i) - m_i$ of the final reconstructed image patch $\hat{x}_i^{final}$ 728 and the corresponding areas of the initial training image patch $x_i$ 718 as follows.

$$L_{local} = |\hat{x}_{final} * \Omega_S - x_i * \Omega_S| \quad \text{(Equation 11)}$$

$L_D$ is the weighted sum of the losses from discriminators $D_{local}$ 710 and $D_{context}$ 708 which are trained with the WGAN criteria as follows.

$$L_D = L_{local} L_{D_{local}} + \lambda_{context} L_{D_{context}} \quad \text{(Equation 12)}$$

$$L_{D_{local}} = \quad \text{(Equation 13)}$$
$$E_{x_i}[D_{local}(x_i * \Omega_{oi})] - E_{z, m_i}[D_{local}(\hat{x}_i^{local})] - \lambda_{gp} G(D_{local})$$

$$L_{D_{context}} = E_{x_i}[D_{context}(x_i * \Omega_{oi}^+)] - \quad \text{(Equation 14)}$$
$$E_{z, m_i}[D_{context}(\hat{x}_i^{context})] - \lambda_{gp} G(D_{cotext})$$

where $\hat{x}_i^{local} = \hat{x}_i^{final} * \Omega_{oi}$, $\hat{x}_i^{context} = \hat{x}_i^{final} * \Omega_{oi}^+ G(D^*) = E_{\hat{x}_i^{final}}[(\|\nabla D^*(\hat{x}_i^*)\|_2 - 1)^2]$ is the gradient penalty.

Once trained, the trained reconstruct network $f_{reconstruct}$ 702 and trained refine network $f_{refine}$ 704 can be applied during an online stage (e.g., method 500 of FIG. 5) for placing random synthetically generated nodules $o_i$ of diameters $d_i$ at random locations (x,y, z) in a 3D image volume.

In one embodiment, the synthetic mesh 712 is rescaled to a target size. The 3D patch surrounding random location (x, y, z) is cropped and fed into the trained reconstruct network $f_{reconstruct}$ 702 and trained refine network $f_{refine}$ 704. Before adding the nodule generated by the trained reconstruct network $f_{reconstruct}$ 702 to the masked background, the generated nodule is multiplied with a scale factor (e.g., ranging from [0.5,1.5]) to adjust the intensity of the generated nodule. The 3D output of the trained refine network $f_{refine}$ 704 may be fused back into the original 3D volume, e.g., when larger patches are needed, such as training a nodule candidate detection network.

Figure 8:
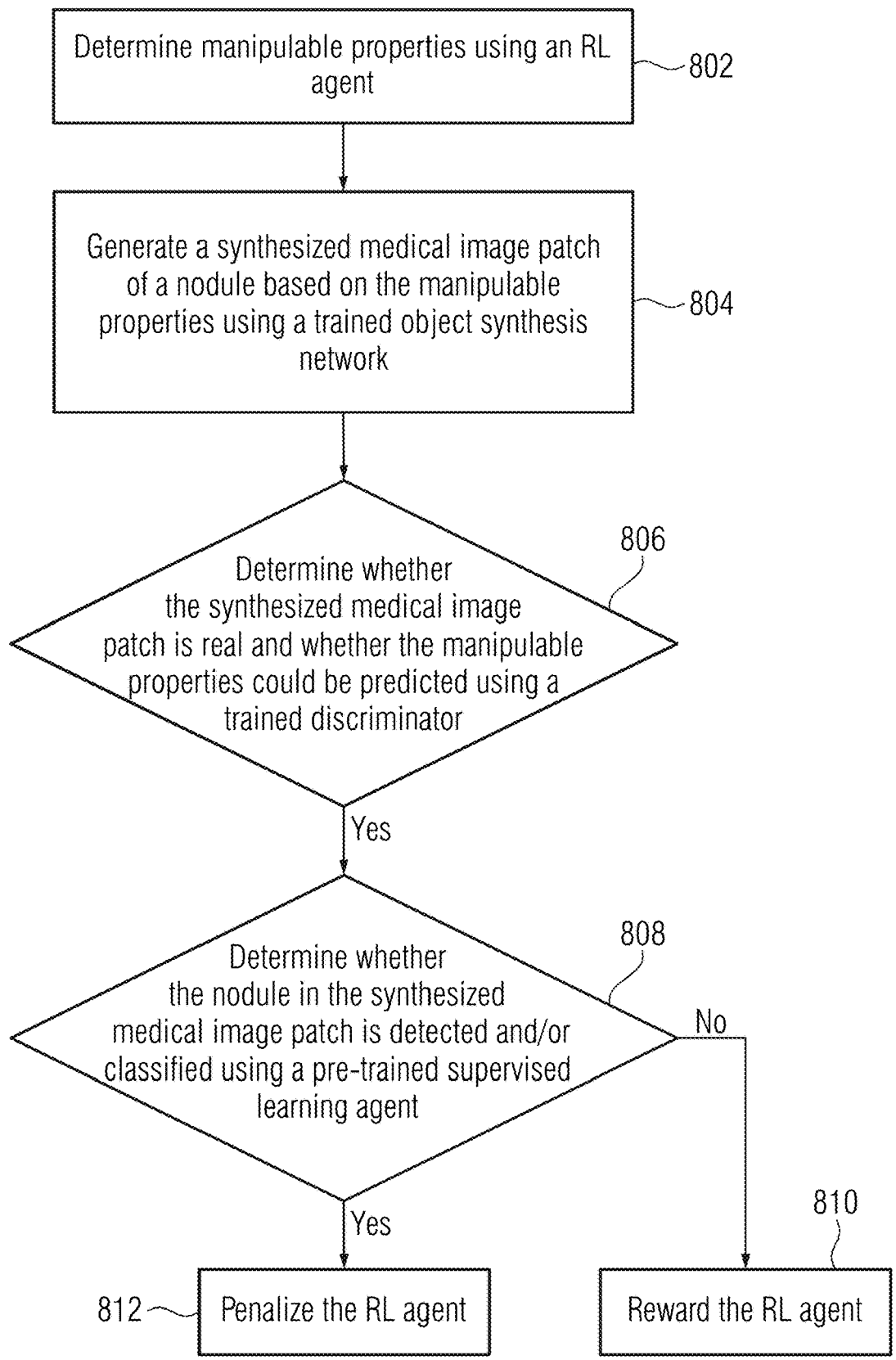
FIG. 8 shows a method for online adversarial sampling using a reinforcement learning agent.

FIG. 8 shows a method 800 for online adversarial sampling using a reinforcement learning (RL) agent, in accordance with one or more embodiments.

At step 802, an RL agent determines manipulable properties. The RL agent is trained to determine the manipulable properties that blends an arbitrary nodule into the lung area of CT images. The manipulable properties output by the RL agent includes a 3D location (x,y,z) and parameters (e.g., shape, size, intensity, texture, boundary appearance, nodule type) of the nodule to be generated.

At step 804, a synthesized medical image patch of a nodule is generated based on the manipulable properties using a trained object synthesis network. In one embodiment, step 804 is performed according to method 500 of FIG. 5 using the trained object synthesis network trained according to network architecture 600 of FIG. 6 and network architecture 700 of FIG. 7.

At step 806, it is determined, using a trained discriminator, whether 1) the synthesized medical image patch is real and 2) whether the manipulable properties could be predicted. In one embodiment, the trained discriminator is a discriminator (e.g., context discriminator $D_{context}$ 708 in FIG. 7) used for training the object synthesis network. If the trained discriminator determines that the synthesized medical image patch is real and correctly predicts the manipulable properties, method 800 proceeds to step 808. If the trained discriminator determines that the synthesized medical image patch is not real (i.e., the trained discriminator determines that the synthesized medical image patch is fake) and/or does not correctly predict the manipulable properties, the synthesized medical image patch is discarded and method 800 ends since failing to detect and/or classify (at step 808) such synthesized medical image patches does not indicate a failure.

At step 808, it is determined whether the nodule in the synthesized medical image patch is detected and/or classified using a pre-trained supervised learning agent (e.g., a detector or classifier). If the pre-trained supervised learning agent is able to detect and/or classify the nodule correctly, at step 812, the RL agent is penalized. For example, a high penalty is given to the RL agent if the error of the classifier is low. If the pre-trained supervised learning agent is not able to detect and/or classify the nodule correctly, at step 810, the RL agent is rewarded. The RL agent is thus trained to generate rare and challenging cases that are under-represented in real training datasets, which could be helpful for improving the robustness of the pre-trained supervised learning agent.

One example application of the embodiments described herein is to improve the performance of pulmonary nodule detection systems. Such pulmonary nodule detection systems are typically built with two stage coarse-to-fine network training: (1) a fully convolutional neural network with a large receptive field to obtain the nodule candidates; and (2) a patch classifier based on the candidate patches to reduce the number of false positives. When training the 3D patch classifier network, the positive patches are sampled from both the synthetic patches and the real patches in each batch. The proportion of the synthetic patches was controlled to be between 20% to 50%. The hard cases in the synthetic patches can be selected based on the output of a patch classifier trained with real data only and the output of the trained discriminators. Since the synthetic patches are all constructed to contain a nodule in it, the patches with low classifier probability are considered as hard positives. At the same time, only the nodule patches that look real were preserved because the knowledge learned from such patches could be generalized to the unseen data. The output from the local discriminator $D_{local}$ was used to discard 20% of the synthetic patches with low quality from the training set.

Embodiments of the invention were experimentally validated. Chest CT images with lung nodules were acquired from the LUNA16 challenge dataset, the NLST cohort, and an additional dataset. The test images from the additional dataset which were reviewed by experienced radiologists were reserved. Because the original NLST images were only annotated with the slice number of the nodules, the precise 3D locations of the nodules were annotated by radiologists. The NLST images were only used for extracting positive training patches since not all the nodules were guaranteed to be annotated. Positive training patches with a nodule centered in the image were extracted. Negative training patches were sampled within the lung area without nodule appearance. The patches were sampled with the size 64×64×32 under the resolution of 0.6×0.6×1 mm. The image patches were clipped with [−1024, 600] Hounsfield unit (HU) values and rescaled to [0, 255]. Segmentation masks of the lung nodules were generated for all positive CT patches with a 3D DenseUNet that was trained on 710 images (LUNA subset 2 to subset 9) obtained from the LIDC dataset. The segmentation masks were used for both training the decompose network $f_{decompose}$. 47400 3D positive nodule patches were synthesized with the background patches randomly sampled from the lung area of the training images in all three datasets. To generate the synthetic masks, the shape embedding from a standard normal distribution were randomly sampled and the synthetic meshes were re-scaled to make sure the diameters of the synthetic nodules are uniformly distributed between 4 mm and 30 mm.

A variational autoencoder (VAE) was built with a multi-layer perceptron with rectified linear unit (ReLU) activation for generating a synthetic mesh. The encoder of the VAE has 3 layers which compress the input of 1452 template 3D vertices to the variational embedding of 100 variables. The decoder of the VAE was built with the symmetric architecture with a linear output. This VAE directly learns the distribution of the 3D coordinates of the transformed meshes. The network was optimized using AMSGrad with the learning rate of 1×10-3 and the batch size of 512.

The encoder of $f_{decompose}$ was built with 3 ResNet blocks with a 2×2 max-pooling each and a bottom ResNet block without max-pooling. $Z_{residual}$ was obtained from the output of the bottom block with 256 feature maps. The feature maps are firstly converted into a 1D vector using the global average pooling and fed into two separate fully connected layers to obtain the variables for sampling $Z_{residual}$. The $f_{reconstruct}$ firstly uses the 6 pairs of a 2×2 upsampling layer and a 3×3 convolutional layer to upsample $Z_{residual}$ to the original patch size. The feature maps are then concatenated with the predicted image segmentation mask and fed into a Res-UNet. $f_{refine}$ has the identical architecture as the ResU-Net in $f_{reconstruct}$. AMSGrad is used for optimizing all the networks used in image decomposition and refining. The initial learning rate of 1×10-3 was used for training all the networks in the generators except the discriminators. The discriminators are trained with the initial learning rate of 1×10-4. To balance the GAN loss with the L1 loss in the training stage 2, we fixed λD to be 0.1.

To compare the embodiments described herein with conventional in-painting methods, a baseline 3D in-painting method was implemented. The generator network was built with a 3D Res-UNet. A WGAN discriminator was built with a 3D DenseNet. The input of the network is a 3D lung CT patch with the center area cropped out. The networks are optimized using a combined L1 loss of the local and global areas together with the WGAN adversarial loss. It was found that conditioning on the random vector could hamper the performance. Generation diversity was introduced by test-time dropout in the generator network.

Figure 9:
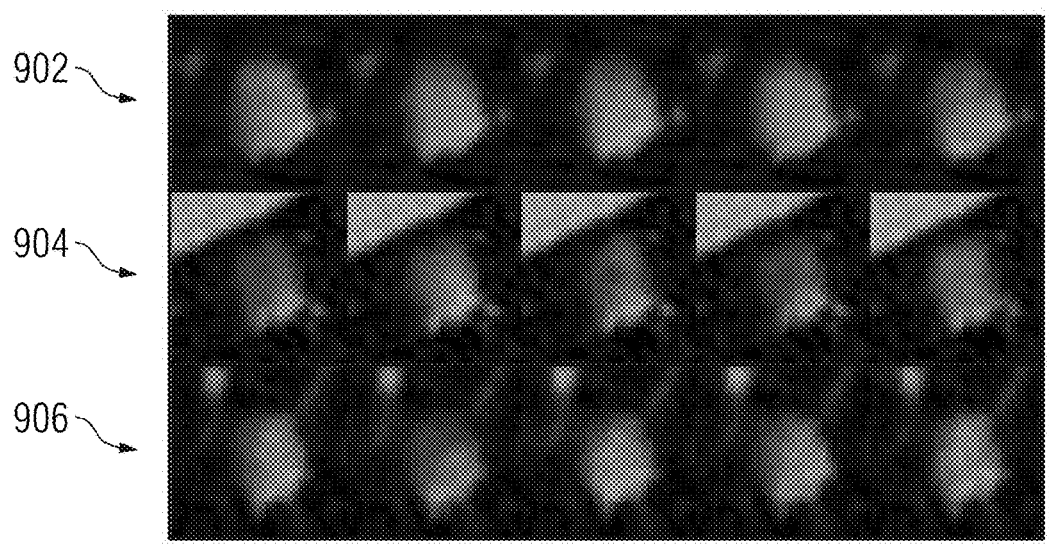
FIG. 9 shows exemplary synthetic images generated according to embodiments described herein.

FIG. 9 shows exemplary synthetic images 900 generated according to embodiments described herein. The images in each respective row 902, 904, and 906 show nodules generated from a same mask $m_i$ but different randomly sampled residual vectors $Z_{residual}$ drawn from a standard normal distribution. As shown in FIG. 9, $Z_{residual}$ manipulates the texture within the generated nodule as well as slightly alters the nodule boundaries.

Figure 10:
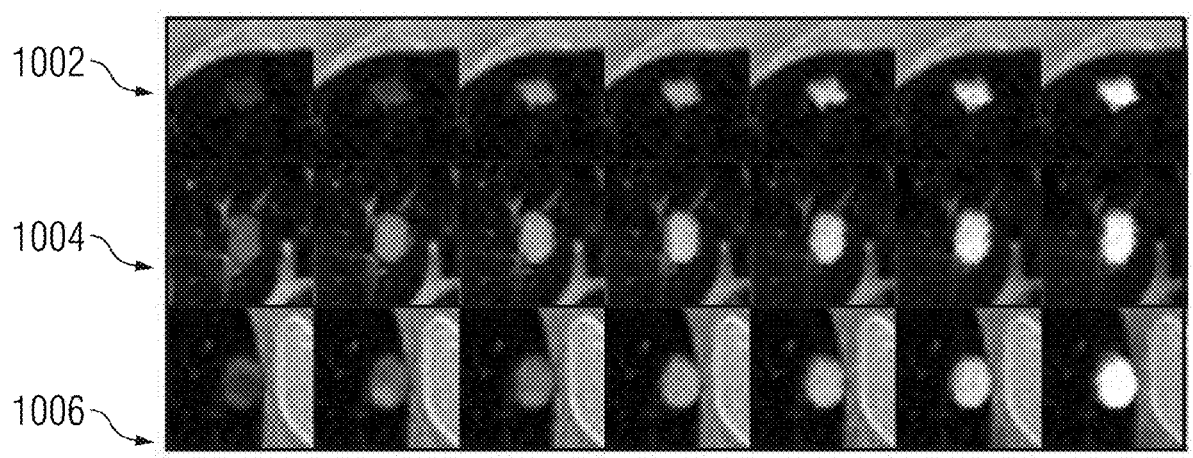
FIG. 10 shows further exemplary synthetic images generated according to embodiments described herein.

FIG. 10 shows exemplary synthetic images 1000 generated according to embodiments described herein. The images in each respective row 1002, 1004, and 1006 show nodules generated from a same mask $m_i$ and residual vectors $Z_{residual}$ but using an increasing scale factor between [0.5, 1.5]. As shown in FIG. 10, the intensity of the generated nodules can be controlled by the intensity scale factor.

Figure 11:
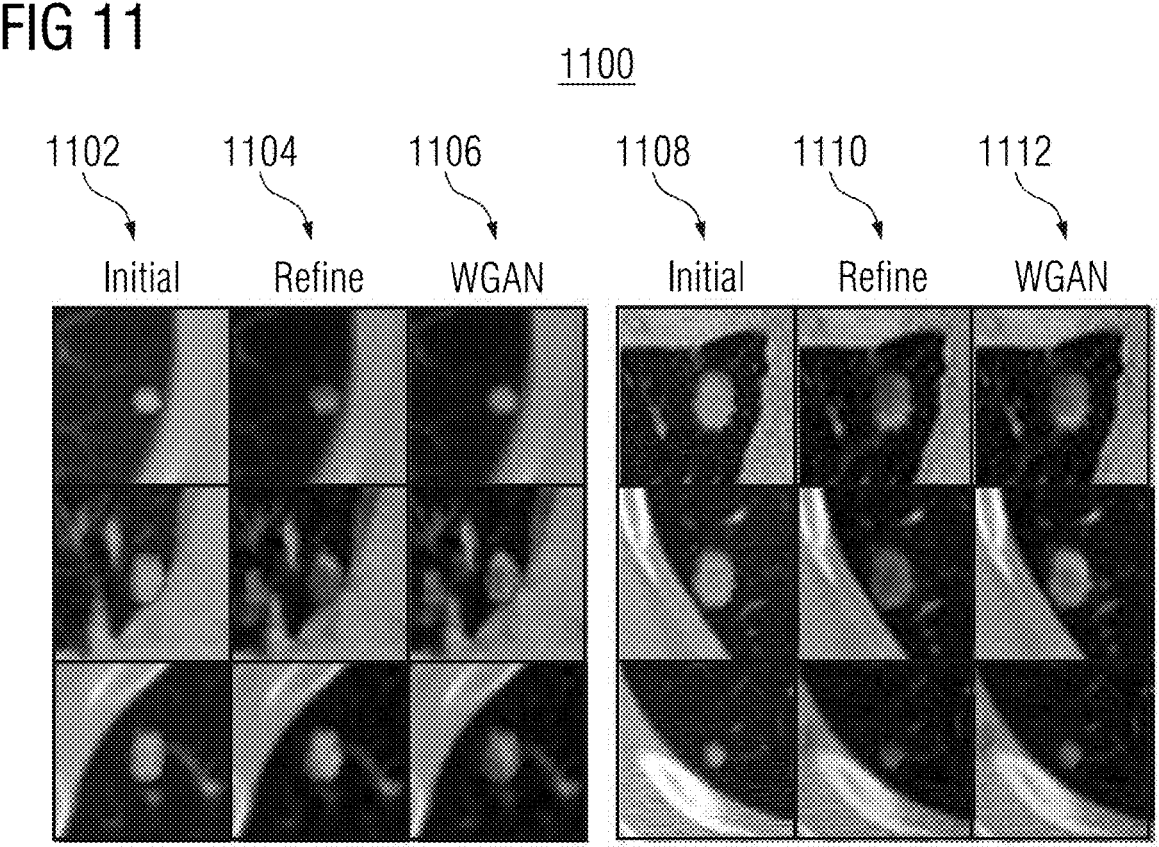
FIG. 11 shows exemplary synthetic images generated according to various embodiments described herein.

FIG. 11 shows exemplary synthetic images 1100 generated at various stages of embodiments described herein. Columns 1102 and 1108 show synthetic images of nodules generated before the refine network $f_{refine}$, columns 1104 and 1110 show synthetic images of nodules generated after the refine network $f_{refine}$, and columns 1106 and 1112 show synthetic images of nodules generated after fine-tuning using WGAN discriminators. As shown in FIG. 11, the adversarial training is helpful for refining the intensities at the core and boundaries of the nodule to blend them into the tissue context.

Figure 12:
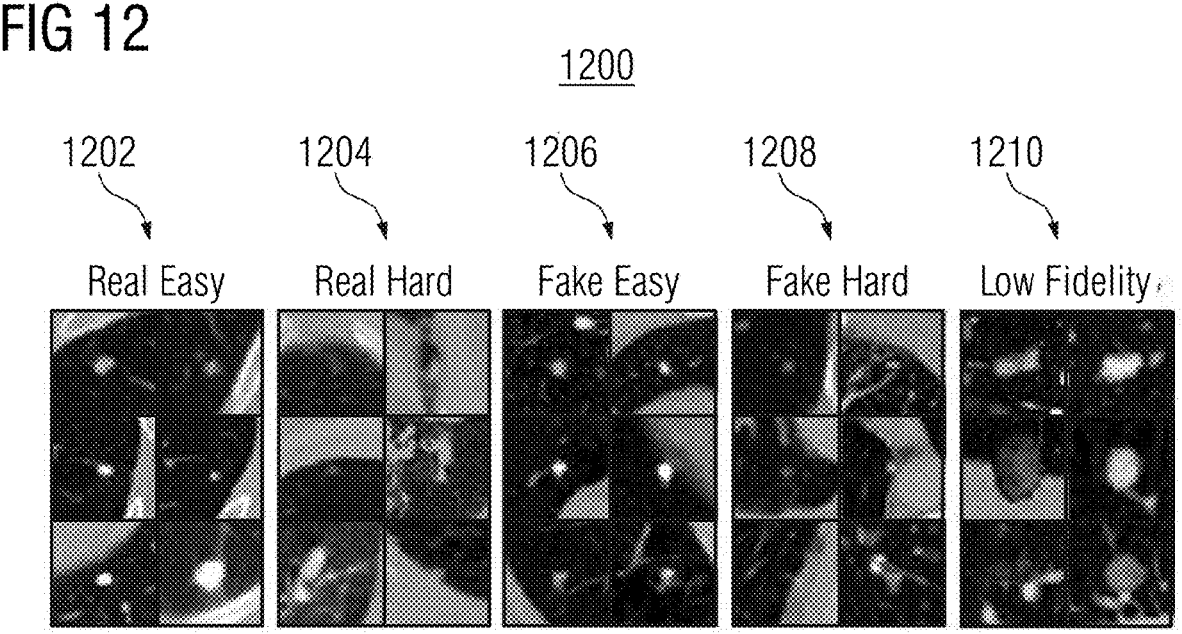
FIG. 12 shows exemplary real image and synthetic images generated according to embodiments described herein.

FIG. 12 shows exemplary real image and synthetic images 1200 generated according to embodiments described herein. Images 1202, referred to as real easy images, show real nodules with greater than 95% classifier output. Images 1204, referred to as real hard images, show real nodules with less than 5% classifier output. Images 1206, referred to as fake easy images, show synthetic nodules with greater than 95% classifier output. Images 1208, referred to as fake hard images, show synthetic nodules with less than 5% classifier output. Images 1210, referred to as low fidelity images, show synthetic nodules having low fidelity (lower than 20% of the mean local discriminator output). In both real and synthetic images, the nodules with high intensity solid cores are easier to classify. The hard patches tend to be of smaller sizes and low average intensity. It also confuses the classifier when the nodule is hidden beside the pulmonary wall or other high-intensity tissue such as vessels or other abnormalities. It is easier for the discriminator to tell a synthetic patch contains a nodule with larger than average diameter or irregular shape. The generator also does not handle the boundary well when it is asked to generate a large nodule besides the pulmonary wall because it is supposed to preserve the nodule boundaries of the training process.

Figure 13:
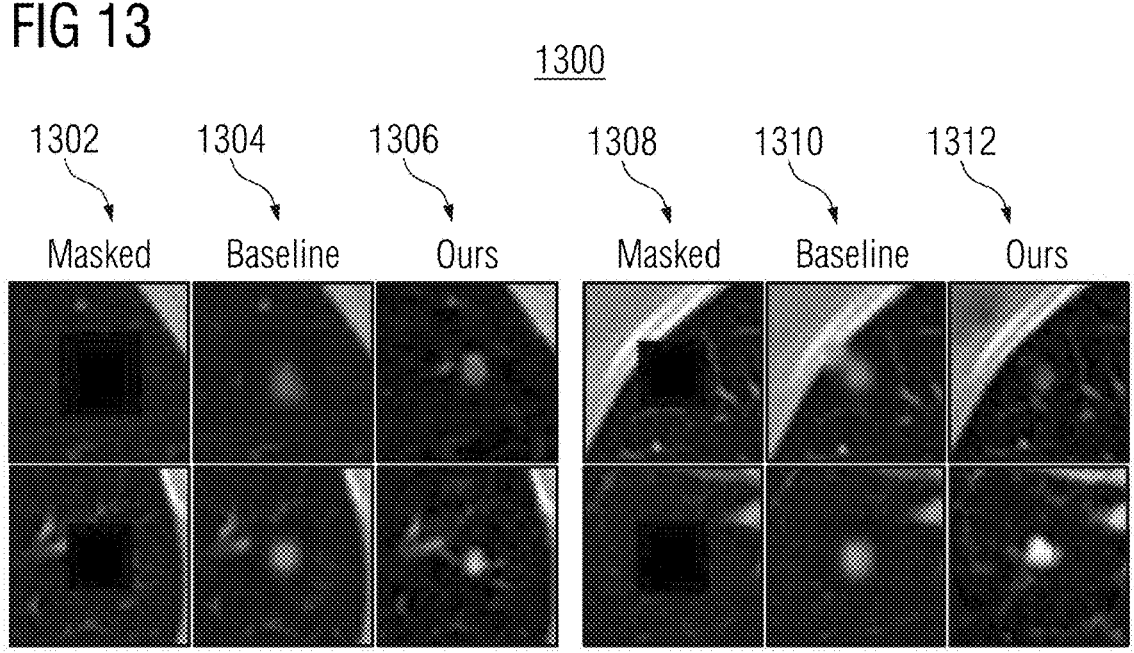
FIG. 13 shows exemplary images generated using a baseline in-painting method and generated according to embodiments described herein.

FIG. 13 shows exemplary images 1300 generated using the baseline in-painting method and generated according to embodiments described herein. Images in columns 1302 and 1308 are masked images used image synthesis. Images in columns 1304 and 1310 are generated using the baseline in-painting method. Images in columns 1306 and 1312 are generated using embodiments described herein.

The object synthesis network was analyzed by focusing on the results of the second stage by freezing the candidate generation network and only training the 3D patch classifier with different settings. The patch classifier is a 3D ResNet50 with the weights pre-trained. The same set of conventional data augmentation techniques were applied, including 90-degree rotation, random scaling and 3 direction flipping, to all the experiments for fair comparison. The free response receiver operating characteristic (FROC) curves and the competition performance metric (CPM) scores on the test images were compared for sampling different proportions of the synthetic patches and the real patches: (1) training without sampling from the synthetic patches; (2) training with 20% of the patches sampled from all the synthetic samples; and (3) training with 50% of the patches sampled from the synthetic samples. It was found that the synthetic data can be helpful for improving the detection performance especially when the number of false positives is low. Using more than 20% only slightly improved the classification performance. The confidence bands were generated with bootstrapping. With the same sampling strategy, the patches generated by the baseline in-painting method did not show improvement. Sampling the positive patches only from the synthetic patches was attempted, which did not work well because the synthetic patches do not cover the entire distribution in the real data, for example, subsolid nodules. A higher detection performance was obtained by only sampling from the hard cases. It was observed that training with batches mixed with real and the selected hard-synthetic patches work slightly better than fine-tuning the classifier already trained on real-data only.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 4-5 and 8. Certain steps or functions of the methods and workflows described herein, including one or more of the steps or functions of FIGS. 4-5 and 8, may be performed by a server or by another processor in a network-based cloud-computing system. Certain steps or functions of the methods and workflows described herein, including one or more of the steps of FIGS. 4-5 and 8, may be performed by a client computer in a network-based cloud computing system. The steps or functions of the methods and workflows described herein, including one or more of the steps of FIGS. 4-5 and 8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 4-5 and 8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 14:
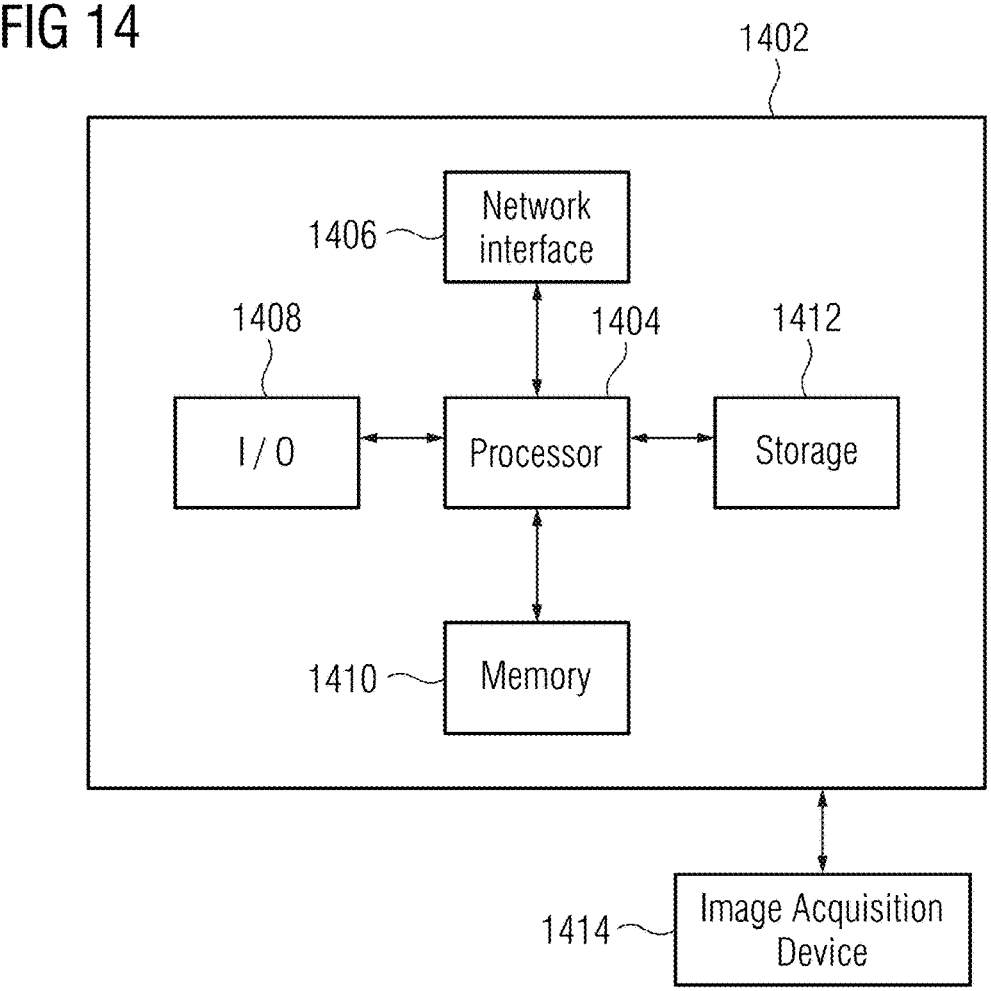
FIG. 14 shows a high-level block diagram of a computer.

A high-level block diagram of an example computer 1402 that may be used to implement systems, apparatus, and methods described herein is depicted in FIG. 14. Computer 1402 includes a processor 1404 operatively coupled to a data storage device 1412 and a memory 1410. Processor 1404 controls the overall operation of computer 1402 by executing computer program instructions that define such operations. The computer program instructions may be stored in data storage device 1412, or other computer readable medium, and loaded into memory 1410 when execution of the computer program instructions is desired. Thus, the method and workflow steps or functions of FIGS. 4-5 and 8 can be defined by the computer program instructions stored in memory 1410 and/or data storage device 1412 and controlled by processor 1404 executing the computer program instructions. For example, the computer program instructions can be implemented as computer executable code programmed by one skilled in the art to perform the method and workflow steps or functions of FIGS. 4-5 and 8. Accordingly, by executing the computer program instructions, the processor 1404 executes the method and workflow steps or functions of FIGS. 4-5 and 8. Computer 1402 may also include one or more network interfaces 1406 for communicating with other devices via a network. Computer 1402 may also include one or more input/output devices 1408 that enable user interaction with computer 1402 (e.g., display, keyboard, mouse, speakers, buttons, etc.).

Processor 1404 may include both general and special purpose microprocessors, and may be the sole processor or one of multiple processors of computer 1402. Processor 1404 may include one or more central processing units (CPUs), for example. Processor 1404, data storage device 1412, and/or memory 1410 may include, be supplemented by, or incorporated in, one or more application-specific integrated circuits (ASICs) and/or one or more field programmable gate arrays (FPGAs).

Data storage device 1412 and memory 1410 each include a tangible non-transitory computer readable storage medium. Data storage device 1412, and memory 1410, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1408 may include peripherals, such as a printer, scanner, display screen, etc. For example, input/output devices 1408 may include a display device such as a cathode ray tube (CRT) or liquid crystal display (LCD) monitor for displaying information to the user, a keyboard, and a pointing device such as a mouse or a trackball by which the user can provide input to computer 1402.

An image acquisition device 1414 can be connected to the computer 1402 to input image data (e.g., medical images) to the computer 1402. It is possible to implement the image acquisition device 1414 and the computer 1402 as one device. It is also possible that the image acquisition device 1414 and the computer 1402 communicate wirelessly through a network. In a possible embodiment, the computer 1402 can be located remotely with respect to the image acquisition device 1414.

Any or all of the systems and apparatus discussed herein may be implemented using one or more computers such as computer 1402.

One skilled in the art will recognize that an implementation of an actual computer or computer system may have other structures and may contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
   receiving an input medical image patch, a segmentation mask, a vector of appearance related parameters, and manipulable properties;
   generating a synthesized medical image patch including a synthesized nodule based on the input medical image patch, the segmentation mask, the vector of appearance related parameters, and the manipulable properties using a trained object synthesis network, the synthesized nodule being synthesized according to the manipulable properties; and
   outputting the synthesized medical image patch.

2. The method of claim 1, wherein the manipulable properties include a nodule intensity based label to define an appearance of the synthesized nodule as being solid, part-solid, ground glass opacity, fully calcified, or partially calcified.

3. The method of claim 1, wherein the manipulable properties include a texture and boundary based label to define an appearance of the synthesized nodule as being spiculated or non-spiculated.

4. The method of claim 1, wherein generating a synthesized medical image patch including a synthesized nodule comprises:
   concatenating a vector representing the manipulable properties with the vector of appearance related parameters.

5. The method of claim 1, wherein generating a synthesized medical image patch including a synthesized nodule comprises:
   generating the segmentation mask to have a size and a shape using a Gaussian process morphable model by defining eigenvectors of Gaussian process morphable model, wherein the synthesized nodule is synthesized to have a size and a shape according to the size and the shape of the segmentation mask.

6. The method of claim 1, wherein the trained object synthesis network comprises a reconstruct network and a refine network, the method further comprising training the object synthesis network by:
   training 1) a decompose network to decompose a particular image patch comprising a nodule into a particular segmentation mask and a particular vector of appearance related parameters and 2) the reconstruct network and the refine network to reconstruct the particular image patch based on the particular segmentation mask and the particular vector of appearance related parameters; and
   refining the refine network based on a random segmentation mask and a random vector of appearance related parameters using the trained reconstruct network.

7. The method of claim 6, wherein refining the refine network based on a random segmentation mask and a random vector of appearance related parameters using the trained reconstruct network comprises:
   refining the refine network with adversarial loss using a local discriminator applied to a region surrounding the nodule in the particular image patch and a context discriminator applied to a larger region in the particular image patch.

8. The method of claim 1, further comprising:
determining the manipulable properties using a reinforcement learning agent;
applying a detector or classifier to detect or classify the synthesized medical image patch; and
penalizing the reinforcement learning agent if the detector or classifier is able to detect or classify the synthesized medical image patch and rewarding the reinforcement learning agent if the detector or classifier is not able to detect or classify the synthesized medical image patch.

9. The method of claim 1, further comprising:
training a machine learning network for detecting or segmenting a nodule in a target medical image patch based on the synthesized medical image patch.

10. An apparatus, comprising:
means for receiving an input medical image patch, a segmentation mask, a vector of appearance related parameters, and manipulable properties;
means for generating a synthesized medical image patch including a synthesized nodule based on the input medical image patch, the segmentation mask, the vector of appearance related parameters, and the manipulable properties using a trained object synthesis network, the synthesized nodule being synthesized according to the manipulable properties; and
means for outputting the synthesized medical image patch.

11. The apparatus of claim 10, wherein the manipulable properties include a nodule intensity based label to define an appearance of the synthesized nodule as being solid, part-solid, ground glass opacity, fully calcified, or partially calcified.

12. The apparatus of claim 10, wherein the manipulable properties include a texture and boundary based label to define an appearance of the synthesized nodule as being spiculated or non-spiculated.

13. The apparatus of claim 10, wherein the means for generating a synthesized medical image patch including a synthesized nodule comprises:
means for concatenating a vector representing the manipulable properties with the vector of appearance related parameters.

14. The apparatus of claim 10, wherein the means for generating a synthesized medical image patch including a synthesized nodule comprises:
means for generating the segmentation mask to have a size and a shape using a Gaussian process morphable model by defining eigenvectors of Gaussian process morphable model, wherein the synthesized nodule is synthesized to have a size and a shape according to the size and the shape of the segmentation mask.

15. A non-transitory computer readable medium storing computer program instructions, the computer program instructions when executed by a processor cause the processor to perform operations comprising:
receiving an input medical image patch, a segmentation mask, a vector of appearance related parameters, and manipulable properties;
generating a synthesized medical image patch including a synthesized nodule based on the input medical image patch, the segmentation mask, the vector of appearance related parameters, and the manipulable properties using a trained object synthesis network, the synthesized nodule being synthesized according to the manipulable properties; and
outputting the synthesized medical image patch.

16. The non-transitory computer readable medium of claim 15, wherein the manipulable properties include a nodule intensity based label to define an appearance of the synthesized nodule as being solid, part-solid, ground glass opacity, fully calcified, or partially calcified.

17. The non-transitory computer readable medium of claim 15, wherein the trained object synthesis network comprises a reconstruct network and a refine network, the operations further comprising training the object synthesis network by:
training 1) a decompose network to decompose a particular image patch comprising a nodule into a particular segmentation mask and a particular vector of appearance related parameters and 2) the reconstruct network and the refine network to reconstruct the particular image patch based on the particular segmentation mask and the particular vector of appearance related parameters; and
refining the refine network based on a random segmentation mask and a random vector of appearance related parameters using the trained reconstruct network.

18. The non-transitory computer readable medium of claim 17, wherein refining the refine network based on a random segmentation mask and a random vector of appearance related parameters using the trained reconstruct network comprises:
refining the refine network with adversarial loss using a local discriminator applied to a region surrounding the nodule in the particular image patch and a context discriminator applied to a larger region in the particular image patch.

19. The non-transitory computer readable medium of claim 15, the operations further comprising:
determining the manipulable properties using a reinforcement learning agent;
applying a detector or classifier to detect or classify the synthesized medical image patch; and
penalizing the reinforcement learning agent if the detector or classifier is able to detect or classify the synthesized medical image patch and rewarding the reinforcement learning agent if the detector or classifier is not able to detect or classify the synthesized medical image patch.

20. The non-transitory computer readable medium of claim 15, the operations further comprising:
training a machine learning network for detecting or segmenting a nodule in a target medical image patch based on the synthesized medical image patch.

\* \* \* \* \*